United States Patent [19]

Marty

[11] Patent Number: 4,793,375

[45] Date of Patent: Dec. 27, 1988

[54] FAUCET VALVE CARTRIDGE

[75] Inventor: Garry R. Marty, Noblesville, Ind.

[73] Assignee: Masco Corporation of Indiana, Indianapolis, Ind.

[21] Appl. No.: 74,222

[22] Filed: Jul. 16, 1987

[51] Int. Cl.⁴ .................. F16K 5/12; F16K 27/06
[52] U.S. Cl. .................. 137/270; 137/454.2; 251/208
[58] Field of Search ............. 137/270, 454.2, 454.5, 137/454.6, 625.31, 614.11; 251/208

[56] References Cited

U.S. PATENT DOCUMENTS

| | | |
|---|---|---|
| 2,807,280 | 9/1957 | Kittredge . |
| 2,909,126 | 10/1959 | Gordon . |
| 3,504,887 | 4/1970 | Okenblom ............... 251/208 |
| 3,756,279 | 9/1973 | Widmaier . |
| 3,807,455 | 4/1974 | Farrell ............... 137/625.31 |
| 3,831,621 | 8/1974 | Anthony ............... 137/270 |
| 3,834,416 | 9/1976 | Parkison . |
| 3,987,819 | 10/1976 | Scheuermann . |
| 4,005,728 | 2/1977 | Thorp ............... 137/270 |
| 4,105,043 | 8/1978 | Nicolayczik ............... 137/454.5 X |
| 4,327,758 | 5/1982 | Uhlmann . |
| 4,331,176 | 5/1982 | Parkison . |
| 4,397,330 | 8/1983 | Hayman ............... 137/270 |
| 4,425,935 | 1/1984 | Gonzalez ............... 137/454.2 X |
| 4,577,835 | 3/1986 | Holycross ............... 137/614.11 X |
| 4,651,770 | 3/1987 | Denham ............... 137/270 |

FOREIGN PATENT DOCUMENTS 0003459  9/1981  France .

Primary Examiner—Martin P. Schwadron
Assistant Examiner—Stephen M. Hepperle
Attorney, Agent, or Firm—Edgar A. Zarins; Steven L. Permut; Malcolm L. Sutherland

[57] ABSTRACT

A faucet valve cartridge for a dual handle faucet which facilitates conversion between a lever-operated faucet and a knob-operated faucet utilizing identical components. The cartridge may be used to control either the hot-water supply or the cold-water supply to the faucet spout. The cartridge includes an integrally formed stop member and housing within which is rotatably disposed a valving member. The housing includes a pair of outlet ports and is open to the bottom to receive the valving member and a pair of cooperating valving plates which control fluid flow. Orientation of the valving plates within the housing controls the specific configuration of the valve cartridge. Preferably the valving plates are made of a ceramic material to reduce wear and facilitate rotation.

12 Claims, 2 Drawing Sheets

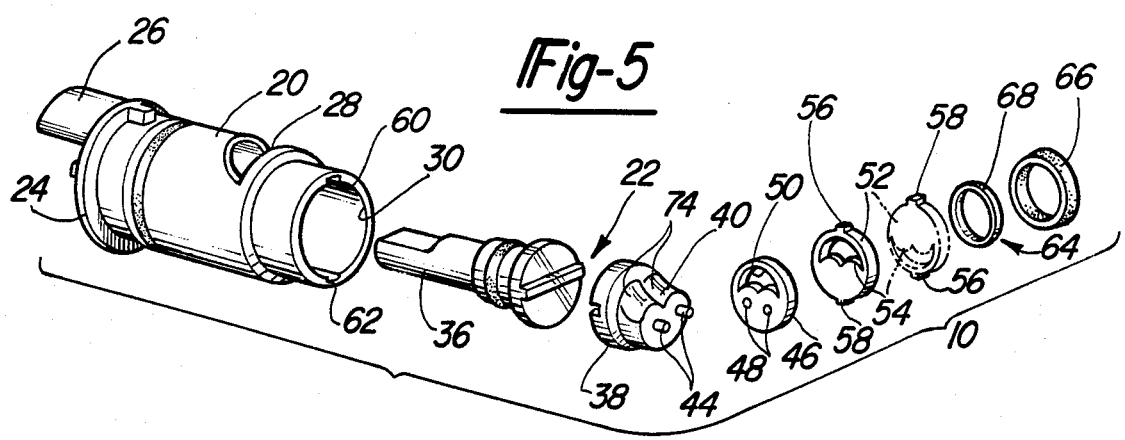
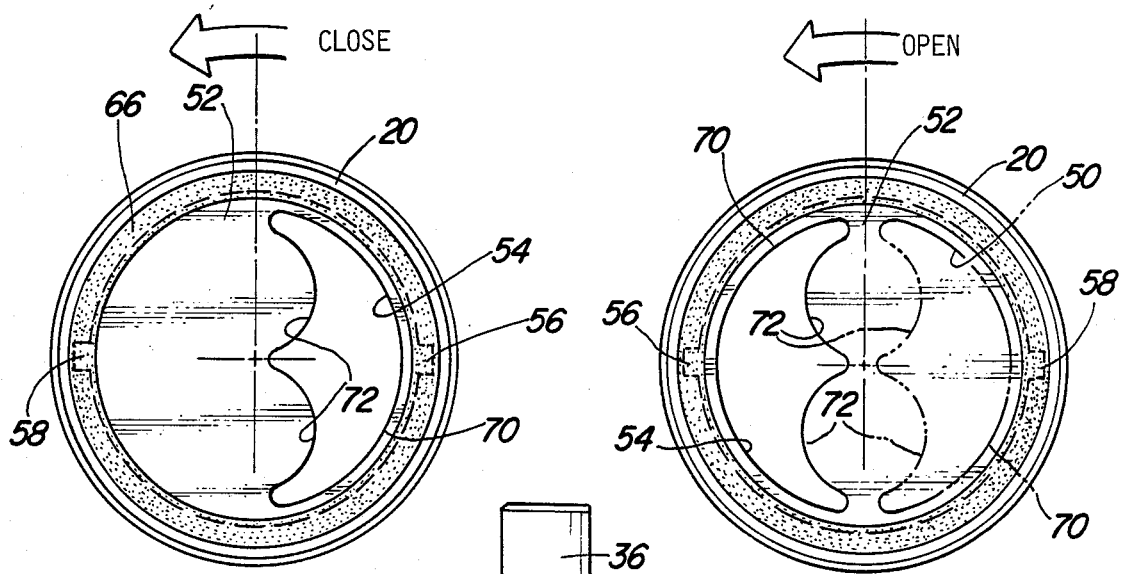
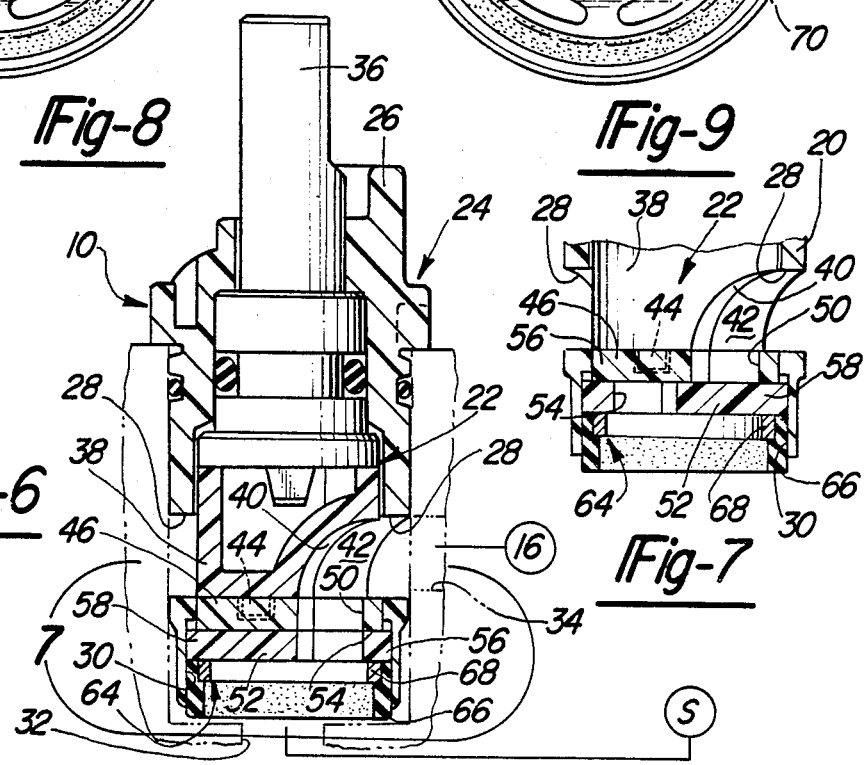

FAUCET VALVE CARTRIDGE

BACKGROUND OF THE INVENTION

I. Field of the Invention

The invention relates to a valve for controlling the fluid flow through a faucet and, in particular, to a valve cartridge for controlling either the hot or cold water supply for the faucet and adaptable to either a lever-operated faucet or a knob-operated faucet.

II. Description of the Prior Art

Typically, faucets are controlled by either a single-handle which utilizes a mixing valve to proportion the flow of hot and cold water to the faucet spout, or dual-handles which utilize individual valves for the hot water and cold water controls. These valves are in the form of cartridges having inlet and outlet openings and a valve stem utilized to control the rotation of the valving member within the valve body. In the case of the mixing valve, two inlets are provided, one each for the hot and cold water supplies. The single source valve includes only one inlet opening which fluidly communicates with the flow pasageway of the valving member. In both cases, fluid flow is proportioned by bringing the flow openings into and out of registry with corresponding openings in the valve body.

Because of the reverse configuration of the hot and cold water assemblies in dual-handle faucets, it has been necessary to manufacture different valve cartridges for lever-operated and knob-operated faucets. In a lever-operated faucet, water flow is initiated by rotating the levers in opposite directions, i.e. inwardly towards the faucet spout. In a knob-operated faucet, the knobs are typically rotated in the same direction, i.e. counter-clockwise, to initiate water flow. While the hot-water control for both faucet assemblies is rotated identically and thus the same cartridge can be used in both, the cold-water cartridges must have opposite rotational configurations. Normally, two different cartridges are manufactured thereby increasing tooling and overall manufacturing costs.

In addition, various configurations of inlet openings have been utilized in an attempt to maximize fluid flow while eliminating fluid flow noise. Initially, a simple circular port was utilized which gave way to semi-circular or "smiley face" configuration which was found to reduce flow noise. However, none of the past known flow port configurations have been found to be totally noise free.

SUMMARY OF THE PRESENT INVENTION

This invention overcomes the disadvantages of the previously known faucet valve cartridges by providing a configuration which can be utilized to control either the hot or cold water supplies in knob-operated and lever-operated faucets. The cartridge also utilizes a uniquely configured inlet flow opening which maximizes fluid flow while reducing flow noise.

The faucet valve cartridge according to the present invention generally comprises an integrally molded stop member and valve body within which is rotatably disposed a valving member including a valve stem which extends through the top of the valve body and is connected to the appropriate operating member. The valve body includes a pair of outlet ports formed on opposite sides thereof such that the outlet can be aligned with the outlet passage to provide fluid flow to the faucet spout for either the hot or cold water supply. The valve body is open at the bottom such that first the valving member and then the flow plates can be inserted therein. The first or upper flow plate is detachably secured to the valving member and rotates in conjunction therewith to control fluid flow. The second or lower flow plate is fixedly secured within the valve body adjacent the upper flow plate. Both flow plates include identical double-crescent flow openings and it is the rotation of the upper plate relative to the lower plate to bring the openings into and out of registry which proportions the fluid flow. A seal ring is utilized to maintain the flow plates within the valve body.

Preferably, the flow plates are made of a ceramic material which is resistant to wear from the fluid flow. The double-crescent flow openings provide efficient fluid flow while greatly reducing flow noise. The lower or fixed flow plate includes a pair of oppositely disposed tabs which are received in grooves formed in the valve body to properly position the flow plate. By reversing the position of the flow plate, the positional configuration of the cartridge is altered in order to accommodate both faucet types. In this manner, the cartridge can be utilized in either a lever-operated faucet or a knob-operated faucet simply by reversing the position of the fixed flow plate. As a result tooling, manufacturing and inventory costs are substantially reduced and the user can change the faucet type at a minimum expense.

Other objects, features and advantages of the invention will be apparent from the following detailed desription taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which:

FIG. 5 is an exploded view of the valve cartridge of the present invention with the inlet flow disk shown in phantom in its alternate position;

FIG. 6 is a cross-sectional perspective of the valve cartridge with the inlet flow disk positioned for use in controlling the cold water flow in a knob-operated faucet (FIG. 2) and the hot water flow in both a knob-operated and a lever-operated faucet assembly;

FIG. 7 is a partial cross-sectional perspective of the valve cartridge with the inlet flow disk positioned for use in controlling the cold water flow in a lever-operated faucet assembly (FIG. 1);

FIG. 8 is a bottom end view of the valve cartridge arrangement of FIG. 6; and

FIG. 9 is a bottom end view of the valve cartridge arrangement of FIG. 7.

DETAILED DESCRIPTION OF A PREFERRED EMBODIMENT OF THE PRESENT INVENTION

Figure 1:
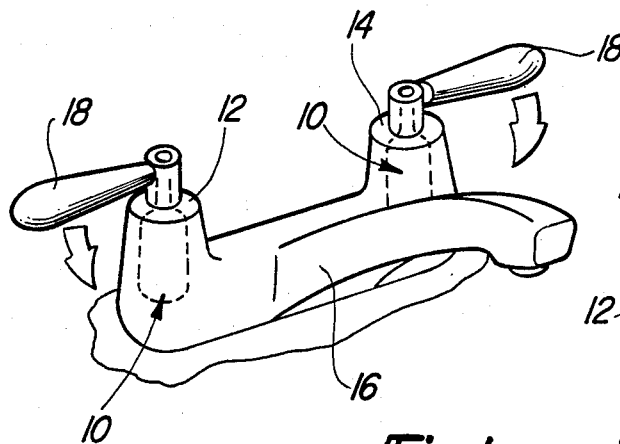
FIG. 1 is an elevated perspective of a lever-operated faucet assembly with movement of the operating levers shown towards the on position.
Figure 2:
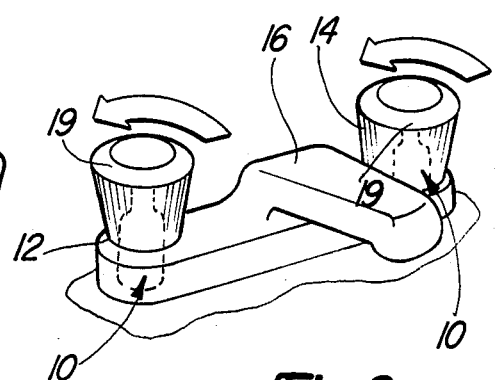
FIG. 2 is an elevated perspective of a knob-operated faucet assembly with movement of the operating knobs shown towards the on position.
Figure 3:
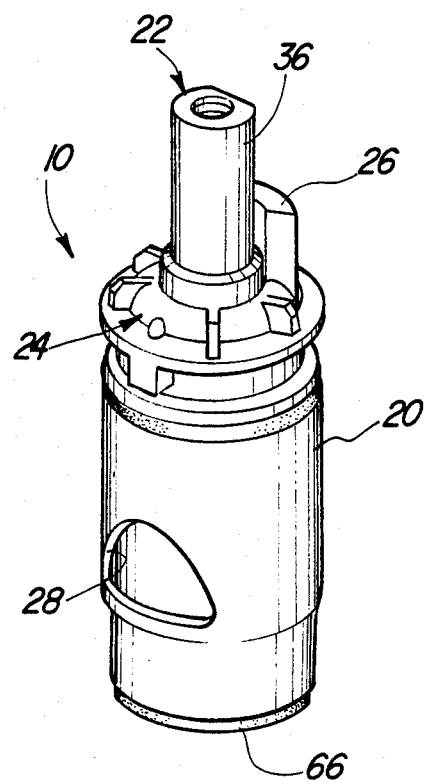
FIG. 3 is an elevated perspective of the valve cartridge of the present invention as viewed from one side of the cartridge.

Referring first to FIGS. 1 and 2, the faucet valve cartridge 10 embodying the present invention is adapted to be used to control either the hot water supply 12 or the cold water supply 14 of a lever-operated faucet (FIG. 1) and a knob-operated faucet (FIG. 2). The different rotational requirements to initiate and interrupt water flow and the orientation of the cartridge 10 relative to the faucet spout 16 normally require the use of up to four different cartridge configurations. The faucet valve cartridge 10 of the present invention may be utilized in both the lever-operated faucet (FIG. 1) wherein fluid flow is initated by rotating the levers 18 inwardly in the direction of the arrows and the knob-operated faucet (FIG. 2) wherein fluid flow is initiated by rotaing the knobs 19 counter-clockwise in the direction of the arrows. All four controls can be operated with the valve cartridge 10 of the present invention.

The faucet valve cartridge 10 is illustrated in FIGS. 3 through 7 and generally comprises an outer valve body 20 and a valving member 22 rotatably disposed within the valve body 20. In a preferred embodiment, the valve body 20 includes an integrally formed stop member 24 having a detent 26 which cooperates with an operating member, namely the lever 18 or knob 19, to limit the rotational movement thereof. The valve body 20 preferably comprises a pair of outlet ports 28 formed in the side wall on opposite sides of the valve body 20. The valving member 22 is received within an axial bore 30 formed in the valve body 20 and open to the bottom thereof. When the cartridge 10 is placed within the housing chamber of the faucet assembly, the open bottom end of the axial bore 30 communicates with the inlet passage 32 of the faucet while one of the outlet ports 28 communicates with the outlet passage 34 of the faucet leading to the faucet spout 16. Which outlet port 28 communicates with the faucet spout 16 is dependent upon the orientation of the cartridge 10 within the faucet determined by whether the cartridge 10 controls the hot or cold water supply. Thus, fluid flow will be directed from the source S through the inlet passage 32 of the faucet chamber into the axial bore 30 and out one of the outlet ports 28 through the outlet passage 34 to the faucet spout 16.

The valving member 22 is rotatably received within the axial bore 30 of the valve body 20 and includes a valve stem 36 which extends through the top of the valve body 20. The valve stem 36 is connected to the lever 18 or knob 19 such that rotation of the lever or knob will cause the valving member 22 to rotate within the valve body 20 limited only by the detent 26 of the stop member 24. The valving member 22 also includes a flow control member 38 which, in the preferred embodiment, is formed as a separate component detachably connected to the valve stem 36. in this manner, the valve stem 36 can be manufactured of metal for added strength while the flow control member 38 can be made of plastic similar to the rest of the valve cartridge 10.

Figure 4:
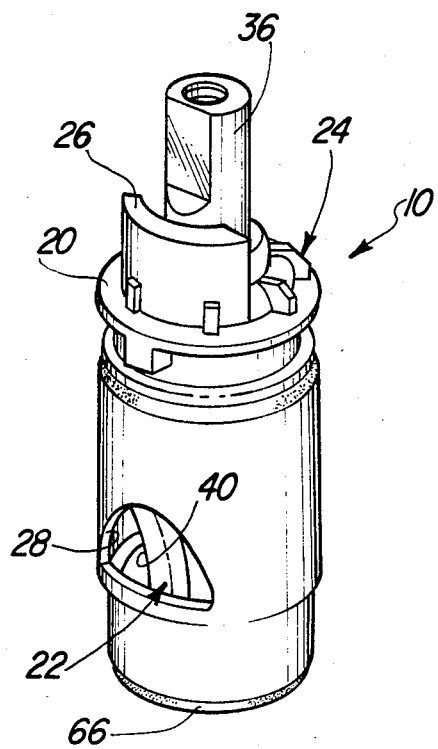
FIG. 4 is an elevated perspective of the valve cartridge of the present invention as viewed from the other side of the cartridge.

The flow control member 38 comprises a flow notch 40 which, when the valving member 22 is placed within the valve body 20, cooperates with the wall of the valve body 20 to form a fluid flow passageway 42 open to the bottom of the valving member 22 and capable of selective registry with at least one of the outlet ports 28 upon rotation of the valving member 22 as shown in FIGS. 4 and 6. Also formed on the bottom of the flow control member 38 are attachment pegs 44 utilized to attach a first fluid flow plate 46 to the valving member 22.

Referring now to FIGS. 5-7, in the preferred embodiment of the invention first flow plate 46 includes a pair of openings 48 formed by partial bores in the plate 46. The openings 48 are designed to receive corresponding attachment pegs 44 of the valving member 22. As a result, first flow plate 46 forms a bottom plate for the valving member 22 and fluid flow passageway 42 which rotates along with the valving member 22. However, the first flow plate 46 may be detached from the valving member 22 for replacement or repair. The flow plate 46 is positioned within the valve body 20 such that the peripheral edge of the plate 46 engages the axial bore 30 of the valve body 20. The first flow plate 46 also includes an inlet aperture 50 which aligns with and forms the inlet opening for the fluid flow passageway 42 when the plate 46 is attached to the valving member 22. Since the plate 46 rotates with the valving member 22, the inlet aperture 50 will remain in registry with the fluid passageway 42 through all the rotational positions thereof.

Disposed within the valve body 20 in adjacent sealing contact with the first flow plate 46 is a second fluid flow plate 52. The second flow plate 52 also includes an inlet aperture 54 having a configuration substantially identical to the inlet aperture 50 of the first flow plate 48. In addition, the second flow plate 52 includes, in the preferred embodiment, a pair of alignment flanges 56 and 58 formed on the peripheral edge of the plate 52. The alignment flanges 56 and 58 are adapted to be received in alignment grooves 60 and 62 formed longitudinally in the inner surface of the axial bore 30 of the valve body 20. The cooperation of the flanges 56 and 58 within the grooves 60 and 62 fixedly retains the second flow plate 52 within the valve body 20 even as the valving member 22 and the first flow plate 46 are rotated. However, the second flow plate 46 can be reversibly mounted within the valve body 20 according to the requirements for fluid flow through the cartridge. In a first position shown in solid in FIG. 5 and in FIGS. 6 and 8, the flange 56 is disposed in groove 60 while flange 58 is seated within groove 62. Because the inlet aperture 54 is offset from the center of the plate 52, the aperture 54 will be located, as a point of reference only, below the detent 26 on the stop member 24. By removing and reversing the second flow plate 52 to a second position such that flange 56 is received within groove 62 while flange 58 is disposed in groove 60, the position of the inlet aperture 54 relative to the valve body 20 will be reversed. Thus, with the second flow plate 52 in its first position the inlet aperture 50 of the first flow plate 46 will be in registry with the aperture 54 of the second flow plate 52 over a different and opposite set of rotational positions than with the second flow plate 52 in its second position (FIGS. 5 (phantom), 7 and 9). Accordingly, the rotational direction to open and close the valve will be opposite as referenced in FIGS. 8 and 9 and described in greater detail hereinafter.

Becuase the first and second flow plates are removably disposed within the valve body 20, means 64 are provided for retaining the plate and sealing the axial bore 30. In one embodiment of the present invention, a tubular seal member 66 is positioned in the end of the axial bore 30 adjacent the second flow plate 52. The seal 66 extends below the bottom of the valve body 20 in order to provide sealing engagement with the bottom of the cartridge chamber and the inlet passage 32. The seal 66 also seals the outer edge of the second flow plate 52 thereby retarding fluid flow around the plate 52. Moreover, the seal 66 acts as a shock absorber to absorb any impact to the operating handles 18 or 19 which will be transmitted and absorbed by the seal member 66. As a result, the shock or impact is not transmitted to the ceramic plates which can cause breakage and failure of the valve. Although the seal member 66 alone provides adequate retainment of the flow plates, a retaining ring 68 may also be included to securely retain the plates. The retaining ring 68 is concentrically disposed within the seal 66 and compresses the seal 66 against the wall of the valve body 20. In this manner, the seal 66 and the flow plates 46 and 52 are prevented from being inadvertently removed from the valve body 20. The retaining ring 68 also prevents the seal 66 from extruding into the flow passage if a load is applied to the handles thereby compressing the seal.

Operation of the valve cartridge 10 permits the identical cartridge structure to be utilized in both the hot and cold water supplies of either a lever-operated faucet (FIG. 1), wherein the cartridges must be rotated in opposite directions, or a knob-operated faucet (FIG. 2) where the cartridges are rotated in the same direction. In both cases, the lever 18 or knob 19 are attached to the valve stem 36 such that upon rotation the valving member 22 will be rotated subject only to the limit of the detent 26 of the stop member 24. In conjunction with rotation of the valving member 22 within the valve body 20 the first flow plate 46 will also be rotated thereby selectively bringing the aperture 50 into reigstry with the aperture 54 of the second flow plate 52. Since water is provided under pressure from the source S when the apertures of the two plates come into partial registry, fluid flow will be initiated through the fluid passageway 42, at least one of the outlet ports 28, and the outlet passage 34 to the faucet spout 16. The volume of flow will be determined by the size of the opening formed by the apertures 50 and 54.

Although operation of the cartridge 10 is similar for both faucet types, the rotational positions over which fluid flow will occur differ according to the positioning of the second flow plate 52. With the second flow plate 52 in the first position as illustrated in FIGS. 6 and 8, the cartridge 10 may be used to control the hot water for either type of faucet (since rotation is identical) and to control the cold water for the knob-type faucet. Alternately, with the second flow plate 52 in the second position as shown in FIGS. 7 and 9, the cartridge 10 may be utilized to control the cold water supply for the lever-operated faucet (FIG. 1). Consequently, with the second plate 52 in its first position, fluid flow is initiated by rotating the valving member 22 counter-clockwise. While in the second position the valving member 22 must be rotated clockwise to initiate fluid flow. This is essentially a result of the positioning of the aperture 54 relative to the detent 26 of the stop member 24 and the limiting effect it has on rotation of the operating member whether it is a lever 18 or a knob 19.

Referring now to FIG. 5, 8 and 9, the fluid flow passageway 42 formed by the flow control member 40 and the apertures of the two flow plates 46 and 52 are provided with a configuration designed to reduce fluid flow noise without sacrificing flow volume. Essentially, the passageway 42 has a "double-crescent" configuration comprising an outer semi-circular edge 70 transvsersed by a pair of smaller linearly-aligned inner semi-circular edges 72. Similarly, the flow control member 40 is provided with flow control channels 74 between a pair of humps which closely conform to the cusps and semi-circular edges of the inlet apertures.

Thus, the present invention provides an efficient faucet valve cartridge which can be utilized to control both the hot water supply and the cold water supply of either a lever-operated or a knob-operated faucet. The changeover can be made without changing the structure of the cartridge simply by reversing the position of the second flow plate within the valve body. As a result, tooling and manufacturing costs are substantially reduced.

The foregoing detailed description has been given for clearness of understanding only and no unnecessary limitations should be understood therefrom as some modifications will be obvious to those skilled in the art without departing from the scope and spirit of the appended claims.

I claim:

1. A faucet valve cartridge adapted to be used in both the hot water supply and the cold water supply of a knob-operated and a lever-operated faucet, said faucet valve cartridge seated within a housing chamber of the faucet having an axial inlet passage and an outlet passage fluidly communicating with the faucet spout, said faucet valve cartridge comprising:

a valve body having an axial bore and a pair of side outlet ports commnicating with said axial bore, said valve body fixedly seated within the housing chamber with one of said outlet ports in communication with the outlet passage of the housing chamber;

a valving member rotatably received within said axial bore of said valve body, said valving member cooperating with said valve body to form a fluid flow passageway open to the bottom of said valving member and capable of selective registry with at least one of said valve body outlet ports, said valving member including a valve stem extending through the upper end of said valve body and a flow control member having a plurality of flow control channels formed the length of said fluid flow passageway to direct fluid flow towards said valve body outlet ports;

a first fluid flow plate fixedly attached to said valving member within said axial bore of said valve body, such that said first flow plate rotates with said valving member, said first flow plate having a single inlet aperture in registry with said fluid flow passageway of said valving member to form an inlet port for said passageway of said valving member;

a second fluid flow plate fixedly mounted within said axial bore of said valve body to prevent rotation thereof, said second flow plate having a single inlet aperture adapted for selective registry with said inlet port of said fluid flow passageway upon rotation of said valving member and first fluid flow plate; and retaining seal means for retaining the said first and second flow plates within said valve body and sealing said axial abore of said valve body against the inlet passage in the bottom of the housing chamber, said retaining seal means including an elastomeric tubular seal disposed within the end of said axial bore and adapted to elastically engage the bottom of said housing chamber and a retaining ring to secure said seal within said axial bore;

wherein upon rotation of said valving member and first flow plate said inlet aperture of said first plate is brought into selective registry with said aperture of said second flow plate to provide fluid flow through said fluid flow passageway, said passageway being in registry with at least one of said valve body outlet ports and the outlet passage, said fluid flow being selectively interrupted by bringing said inlet aperture of said first flow plate into and out of registry with said aperture of said second flow plate;

said inlet aperture of said second flow plate being offset from the center of said plate and the rotational axis of said valving member, said second flow plate capable of being reversibly mounted within said valve body to reorientate said inlet aperture of said second flow plate relative to said valve body, said second flow plate being mounted within said valve body in a first position with said inlet aperture offset to a first side relative to said valve body to provide fluid flow through said fluid passageway over a first set of rotational positions of said valving member and in a second position with said offset inlet aperture reversed 180° to a second side relative to said valve body to provide fluid flow through said passageway over a second set of rotational positions of said valving member.

2. The valve cartridge as defined in claim 1 wherein said valving member comprises a metal valve stem adapted to be attached to an operating member and a plastic flow control member detachably connected to said valve stem.

3. The valve cartridge as defined in claim 2 wherein said flow control member includes at least two attachment pegs formed thereon, said pegs adapted to engage corresponding openings formed in said first fluid flow plate such that said first flow plate is fixedly positioned relative to said valving member and adapted to rotate therewith.

4. The valve cartridge as defined in claim 1 wherein said second flow plate includes a pair of opposing alignment flanges formed on the outer edge of said flow plate, said alignment flanges adapted to cooperate with a pair of opposing longitudinal alignment grooves formed on an inner surface of said valve body to fixedly retain said second flow plate within said valve body, said second flow plate being reversibly mounted within said valve body such that a first alignment flange is received in one of said grooves to mount said second flow plate in said first position and said first alignment flange is received in an other of said grooves to mount said second flow plate in said second position.

5. The valve cartridge as defined in claim 4 wherein said inlet apertures of said first and second flow plates have a substantially identical double-crescent configuration comprising a continuous outer semi-circular edge and a pair of linearly aligned and continuous semi-circular edges extending from one end of the outer edge to the other end of the outer edge, said fluid flow passageway having a cross-sectional configuration substantially corresponding to the configuration of said inlet apertures of said first and second flow plates.

6. The valve cartridge as defined in claim 5 wherein said first and second flow plates are made of a ceramic material and disposed within said valve body in adjacent rotational cooperation.

7. A faucet valve cartridge adapted to be used in both the hot water supply and the cold water supply of a knob-operated faucet and a lever-operated faucet, said faucet cartridge seated within a housing chamber of the faucet having an axial inlet passage and an outlet passage fluidly communicating with the faucet spout, said faucet valve cartridge comprising:

a valve body having an axial bore and a pair of side outlet ports communicating with said axial bore, said valve body fixedly sealed within the housing chamber with one of said outlet ports in communication with the outlet passage of the housing chamber;

a valving member rotatably received within said axial bore of said valve body, said valving member cooperating with said valve body to form a fluid flow passageway open to the bottom of said valving member and capable of selective registry with at least one of said valve body outlet ports;

a first fluid flow plate attached to said valving member for rotation therewith within said axial bore of said valve body, said first flow plate having a single inlet aperture offset from the axis of rotation of said valving member and flow plate and in registry with said fluid flow passageway of said valving member to form an offset inlet port for said passageway of said valving member;

a second fluid flow plate fixedly mounted within said axial bore of said valve body to prevent rotation thereof, said second flow plate having a single offset inlet aperture adapted for selective registry with said inlet port of said fluid flow passageway upon rotation of said valving member and first fluid flow plate;

retaining seal means for retaining said first and second flow plates within said valve body and sealing said axial bore of said valve body against the inlet passage in the bottom of the housing chamber;

wherein upon rotation of said valving member and first flow plate said offset inlet aperture of said first plate is brought into selective registry with said offset aperture of said second flow plate to provide fluid flow through said fluid flow passageway, said passageway being in registry with at least one of said valve body outlet ports and the outlet passage, said fluid flow being selectively interrupted by bringing said offset inlet aperture of said first flow plate into and out of registry with said offset aperture of said second flow plate;

said second flow plate capable of being reversibly mounted within said valve body to reorientate said offset inlet aperture of said second flow plate relative to said valve body, said second flow plate being mounted within said valve body in a first position with said inlet aperture offset to a first side relative to said valve body to provide fluid flow through said fluid passageway over a first set of rotational positions of said valving member and in a second position relative to said valve body with said inlet aperture offset to a second side 180° from said first side to provide fluid flow through said fluid passageway over a second set of rotational positions of said valving member whereby said second flow plate is selectively mounted within said valve body to provide fluid flow control in accordance with the rotational requirements of the faucet.

8. The valve cartridge as defined in claim 7 wherein said valving member comprises a valve stem extending through an upper end of said valve body and a flow control member having a plurality of flow control channels formed the length of said fluid flow passageway to direct fluid flow towards said valve body outlet ports while reducing fluid flow noise.

9. The valve cartridge as defined in claim 8 wherein said offset inlet apertures of said first and second flow plates have a substantially identical configuration comprising a continuous outer semi-circular edge and a pair of aligned semi-circular edges extending transversely across said flow plate from one end of said outer edge to the other end of said outer edge, said fluid flow passageway having a cross-sectional configuration substantially corresponding to the configuration of said inlet apertures of said first and second flow plates thereby minimizing fluid flow noise.

10. The valve cartridge as defined in claim 7 wherein said second flow plate includes a pair of opposing alignment flanges formed on the outer edge of said flow plate, said alignment flanges adapted to cooperate with a pair of opposing longitudinal alignment grooves formed on an inner surface of said valve body to fixedly retain said second flow plate within said valve body, said second flow plate being reversibly mounted within said valve body such that a first alignment flange is received in one of said grooves to mount said second flow plate in said first position and said first alignment flange is received in an other of said grooves to mount said second flow plate in said second position.

11. A faucet valve cartridge adapted to be used in both the hot water supply and the cold water supply of a knob-operated faucet and a lever-operated faucet, said faucet valve cartridge seated within a housing chamber of the faucet having an axial inlet passage and an outlet passage fluidly communicating with the faucet spout, said faucet valve cartridge comprising:

a valve body having an axial bore and a pair of oppositely disposed side outlet ports communicating with said axial bore, said valve body fixedly seated within the housing chamber with one of said outlet ports in communication with the outlet passage of the housing chamber;

a valving member rottably received within said axial bore of said valve body, said valving member including a flow control member having a plurality of flow control channels and cooperating with said valve body to form a fluid flow passageway open to the bottom of said valving member and capable of selective registry with at least one of said valve body outlet ports, said flow control channels extending the length of said fluid flow passageway to direct fluid flow towards said valve body outlet ports;

a first fluid flow plate attached to said valving member for rotation therewith within said axial bore of said valve body, said first flow plate having a single inlet aperture offset from the axis of rotation of said valving member and flow plate and in registry with said fluid flow passageway of said valving member to form an offset inlet port for said passageway of said valving member;

a second fluid flow plate fixedly mounted within said axial bore of said valve body to prevent rotation thereof, said second flow plate having a single inlet aperture offset from the center of said flow plate and adapted for selective registry with said inlet port of said fluid flow passageway upon rotation of said valving member and first fluid flow plate;

retaining seal means for retaining said first and second flow plates within said valve body and sealing said axial bore of said valve body against the inlet passage in the bottom of the housing chamber, said retaining seal means including an elastomeric tubular seal disposed within the end of said axial bore and adapted to elastically engage the bottom of said housing chamber and a retaining ring to secure said seal within said axial bore;

wherein upon rotation of said valving member and first flow plate said inlet aperture of said first plate is brought into selective registry with said aperture of said second flow plate to provide fluid flow through said fluid flow passageway, said passageway being in registry with at least one of said valve body outlet ports and the outlet passage, said fluid flow being selectively interrupted by bringing said inlet aperture of said first flow plate into and out of registry with said aperture of said second flow plate;

said second flow plate capable of being reversibly mounted within said valve body to reorientate said offset inlet aperture of said second flow plate 180° relative to said valve body, said second flow plate being mounted within said valve body in a first position with said inlet aperture offset to a first side relative to said valve body to provide fluid flow through said fluid passageway over a first set of rotational positions of said valving member and in a second position with said inlet aperture offset to a second side relative to said valve body to provide fluid flow through said fluid passageway over a second set of rotational positions of said valving member.

12. A faucet valve cartridge adpated to be used in both the hot water supply and the cold water supply of a knob-operated faucet and a lever-operated faucet, said faucet cartridge sealed within a housing chamber of the faucet having an axial inlet passage and an outlet passage fluidly communicating with the faucet spout, said faucet valve cartridge comprising;

a valve body having an axial bore and a pair of side outlet ports communicating with said axial bore, said valve body fixedly seated within the housing chamber with one of said outlet ports in communication with the outlet passage of the housing chamber;

a first fluid flow plate attached to said valving member for rotation therewith within said axial bore of said valve body, said first flow plate having an inlet aperture offset from the axis of rotation of said valving member and flow plate and in registry with said fluid flow passageway of said valving member to form an offset inlet port for said passageway of said valving member;

a second fluid flow plate fixedly mounted within said axial bore of said valve body to prevent rotation thereof, said second flow plate having an offset inlet aperture adapted for selective registry with said inlet port of said fluid flow passageway upon rotation of said valving member and first fluid flow plate;

said offset inlet apertures of said first and second flow plates having a substantially identical configuration comprising a continuous outer semi-circular edge and a pair of aligned semi-circular edges extending transversely across said flow plate from one end of said outer edge to the other end of said outer edge, said fluid flow passageway having a cross-sectional configuration substantially corresponding to the configuration of said inlet apertures of said first and second flow plates thereby minimizing fluid flow noise;

wherein upon rotation of said valving member and first flow plate said offset inlet aperture of said first plate is brought into selective registry with said offset aperture of said second flow plate to provide fluid flow through said fluid flow passageway, said passageway being in registry with at least one of said valve body outlet ports and the outlet passage, said fluid flow being selectively interrupted by bringing said offset inlet aperture of said first flow plate into and out of registry with said offset aperture of said second flow plate;

said second flow plate capable of being reversibly mounted within said valve body to reorientate said offset inlet aperture of said second flow plate relative to said valve body, said second flow plate being mounted within said valve body in a first position with said inlet aperture offset to a first side relative to said valve body to provide fluid flow through said fluid passageway over a first set of rotational positions of said valving member and in a second position with said inlet aperture offset to a second side relative to said valve body to provide fluid flow through said fluid passageway over a second set of rotational positions of said valving member whereby said second flow plate is selectively mounted within said valve body to provide fluid flow control in accordance with the rotational requirements of the faucet.

* * * * *